US005307225A

United States Patent [19]

Ohishi et al.

[11] Patent Number: 5,307,225

[45] Date of Patent: Apr. 26, 1994

[54] AZIMUTH REGULATING MECHANISM IN FLOPPY DISC DRIVE

[75] Inventors: Yoshiyuki Ohishi, Komae; Masao Kita, Higashimurayama; Yoshikazu Matsumura, Shinjuku; Mamoru Fujisawa, Itabashi, all of Japan

[73] Assignee: Citizen Watch Co., Ltd., Tokyo, Japan

[21] Appl. No.: 6,762

[22] Filed: Jan. 21, 1993

[30] Foreign Application Priority Data

Jan. 28, 1992 [JP] Japan ............................ 4-007794[U]

[51] Int. Cl.[5] ............................................... G11B 5/56

[52] U.S. Cl. .................................................. 360/109

[58] Field of Search ........................................ 360/109

[56] References Cited

FOREIGN PATENT DOCUMENTS 62-154318 7/1987 Japan .................................. 360/109
63-136363 6/1988 Japan .................................. 360/109
63-161513 7/1988 Japan .
63-239612 10/1988 Japan .................................. 360/109
1-251469 10/1989 Japan .
4082008 7/1990 Japan .................................. 360/109

*Primary Examiner*—A. J. Heinz
*Attorney, Agent, or Firm*—Oliff & Berridge

[57] ABSTRACT

An azimuth regulating mechanism is provided which can easily perform the azimuth regulation with an increased precision after a carriage including a magnetic head mounted thereon has been fixed to the frame of a floppy disc drive. The carriage is slidably supported by a guide rail which is firmly held against fixing pins on the frame by means of a guide rail holder. One of the fixing pins is in contact with an eccentric portion formed on the guide rail. When the guide rail is rotated, it can be finely regulated in the horizontal direction to regulate the azimuth angle of the head on the carriage.

5 Claims, 2 Drawing Sheets

AZIMUTH REGULATING MECHANISM IN FLOPPY DISC DRIVE

BACKGROUND OF THE INVENTION

1. Field of the Invention

The present invention relates to a carriage guide mechanism which is incorporated into a floppy disc drive to guide the movement of a carriage having a magnetic head mounted thereon.

2. Description of the Related Art

Floppy disc drives are currently being used, as external memories, in many personal computers, word processors and other computers. In order to read/write data properly in such floppy disc drives, it is desirably required to regulate the azimuth angle of a read/write head to a correct position. A floppy disc drive comprising a carriage which includes upper and lower heads capable of holding a floppy disc therebetween and is movable along guide rails to the position of read/write data on the disc, is disclosed, for example, in Japanese Patent Laid-Open Nos. Hei 1-251469 and Sho 63-161513. In such a floppy disc drive, the carriage further includes an azimuth regulating means. The carriage is guided by two rails as in the Laid-Open No. Sho 63-161513 or by a single rail as in the Laid-Open No. Hei 1-251469. The azimuth regulating means described in the Laid-Open No. Sho 63-161513 is adapted to regulate the angle of the head on the carriage to a desired azimuth angle by finely regulating one of the two guide rails at one end in the horizontal direction using a screw mechanism. On the other hand, the single guide rail described in the Laid-Open No. Hei 1-251469 is fixed at one end to the machine body with the other end being finely regulated in the horizontal direction by a screw mechanism to move the carriage. Thus, the head mounted on the carriage can be regulated to a correct azimuth angle.

In the prior art, however, the regulating mechanism has too many parts and requires a complicated regulating operation due to roughness in the screw pitch or the configuration of the screw tip. Time is also required to make a high-accuracy regulation. As the number of parts increases, the arrangement becomes more complicated and also requires time to assemble the parts. This leads to an increase in the manufacturing cost. Furthermore, the operability is very low since the guide rail or rails must be diametrically regulated by rotating the screw by the use of a screw driver without interruption to various surrounding parts.

It is therefore an object of the present invention to provide an azimuth regulating mechanism which can overcome the aforementioned problems in the prior art.

SUMMARY OF THE INVENTION

To this end, the present invention provides an azimuth regulating mechanism comprising eccentric means formed on the guide rail and fixing means formed on the floppy disc drive frame for fixing the guide rail to the frame, whereby the azimuth angle of the head can be regulated by selecting a position of contact between the eccentric and fixing means.

More particularly, the azimuth regulating mechanism of the present invention is adapted to move the guide rail at one end in the horizontal direction by rotating the guide rail so that the carriage is finely moved in the horizontal direction to regulate the azimuth angle of the head thereon.

DETAILED DESCRIPTION OF THE PREFERRED EMBODIMENTS

Figure 1:
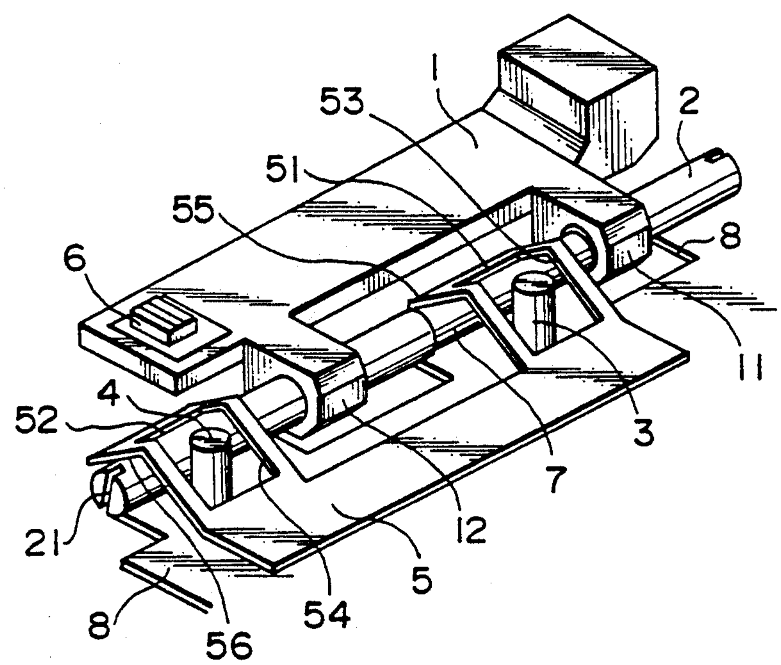
FIG. 1 is a perspective view of one embodiment of a carriage guide mechanism constructed in accordance with the present invention.

Referring first to FIG. 1, there is shown a carriage 1 slidably supported on a single guide rail 2. The carriage 1 includes a head 6 mounted thereon, the head 6 being capable of electro-magnetically reading and writing data. An eccentric portion 7 having a circular cross-section offset from the axis of the guide rail is formed on the guide rail at its substantially central part which will not interrupt the movement of the carriage 1. The guide rail 2 also includes grooves 21 formed therein at the opposite ends for receiving a screw driver (not shown). The guide rail 2 is held by a guide rail holder 5 which is screwed to a frame 8. The guide rail holder 5 includes two arms 51 and 52 formed to extend therefrom. Each of the arms 51 or 52 includes an aperture 53 or 54 formed therein, through which a fixing pin 3 or 4 passes. The arms 51 and 52 are resilient so that their inwardly bent holding portions 55 and 56 can urge the guide rail 2 simultaneously against the frame 8 and also toward the fixing pins 3 and 4 on the frame 8.

The above components may be assembled as follows:

The carriage 1 is first slidably supported by the guide rail 2 so that the eccentric portion 7 of the guide rail 2 is positioned between two legs 11 and 12 in the carriage 1. The guide rail 2 is then placed on the frame 8 with the carriage 1 mounted on the guide rail 2. The guide rail 2 is brought, at one end, into contact with the fixing pin 4 while the eccentric portion 7 is brought into contact with the fixing pin 3. In such a state, the inwardly bent portions 55 and 56 of the guide rail holder 5 are brought into pressure contact with the guide rail 2 while mating the apertures 53 and 54 in the arms 51 and 52 of the guide rail holder 5 to the respective fixing pins 3 and 4. Finally, the guide rail holder 5 is fastened to the frame 8 by fastening screw means (not shown). In such a manner, the guide rail 2 can be mounted on and firmly fixed to the frame 8 by means of the resilient and inwardly bent portions 55 and 56 of the guide rail holder 5.

Figure 2A:
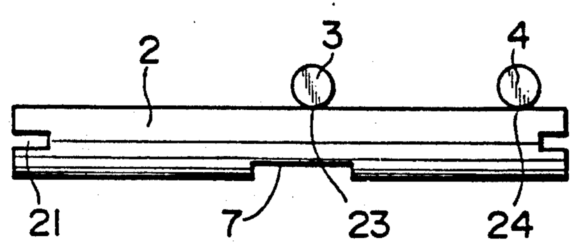
FIG. 2A is a schematic view of an eccentric portion in the guide rail before the azimuth angle is regulated.
Figure 2B:
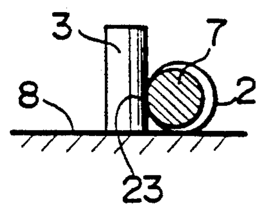
FIG. 2B is an enlarged cross-section of the eccentric portion shown in FIG. 2A.
Figure 3A:
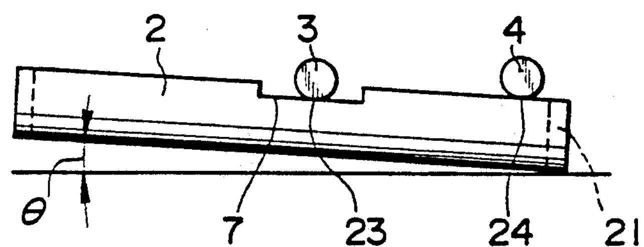
FIG. 3A is a schematic view of the eccentric portion after the azimuth angle has been regulated.
Figure 3B:
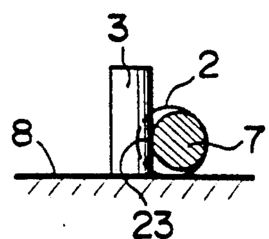
FIG. 3B is an enlarged cross-section of the eccentric portion shown in FIG. 3A.

Referring now to FIGS. 2 and 3, the azimuth regulation of the present invention will be described in more detail. FIG. 2A illustrates the relationship between the fixing pins 3, 4 and the guide rail 2 when the azimuth is not correct while FIG. 3A illustrates the same relationship when the azimuth is properly regulated. FIGS. 2B and 3B show the eccentric portion 7 under such states, respectively. The entire carriage 1 including the head 6 is regulated relative to azimuth angle by finely regulating the angular position of the guide rail 2 from a position before the azimuth regulation shown in FIG. 2A. Such a regulation may be carried out by rotating the guide rail 2 when the screw driver (not shown) is engaged into one of the opposite end grooves 21 in the guide rail 2 and rotated. A contact point 24 between the fixing pin 4 and the guide rail 2 will not be changed with respect to its plane position by the regulating operation. As the guide rail 2 is being rotated about its axis, however, a contact point 23 between the fixing pin 3 and the guide rail 2 will be gradually changed with respect to its plane position. Thus, the axis of the guide rail 2 is inclined to create a deviation 0. Similarly, the carriage 1 slidably supported by guide rail 2 is deviated within the deviation range said. Thus, the head 6 fixedly mounted on the carriage 1 can be deviated and regulated with its azimuth angle. By the resiliency of the guide rail holder 5 which is applied near the fixing pins 3 and 4 during the regulation, the guide rail 2 is urged against the frame 8 and fixing pins 3, 4 so that the guide rail 2 is firmly held against any impact.

As will be apparent from the foregoing, the carriage guide mechanism of the present invention can move the carriage in the horizontal direction only by rotating the guide rail about its axis. The azimuth regulating mechanism of the present invention is very simple in construction since it requires no special means, such as a screw regulating mechanism as in the prior art. Therefore, the azimuth regulating mechanism will not be adversely affected by erroneous precision of various finished parts. Furthermore, the present invention can decrease the number of parts to be used and facilitate the assembly of the parts, resulting in a large reduction of the entire manufacturing cost.

We claim:

1. A floppy disc drive carriage drive system having guide rail means for moving a carriage with a magnetic head along a magnetic recording medium, said carriage drive system having an azimuth regulating mechanism comprising:

eccentric means comprising an interior portion of said guide rail means having a cross-section different than the rest of said guide rail means; and fixing means for holding said eccentric means when said eccentric means is urged against said fixing means, said guide rail means being rotatable with a predetermined torque.

2. An azimuth regulating mechanism as defined in claim 1 wherein the eccentric means in said guide rail means has a circular cross-section offset from the axis of said guide rail means.

3. An azimuth regulating mechanism as defined in claim 1 wherein the eccentric means in said guide rail means is urged against fixing pin means by a guide rail holder which is fixed to a frame of said floppy disc drive.

4. An azimuth regulating mechanism as defined in claim 1, wherein said eccentric means comprises a recess formed in said guide rail means, wherein said eccentric means is adapted to receive said fixing means.

5. An azimuth regulating mechanism for a floppy disc drive carriage drive system having a rotatable guide rail, comprising:

an eccentric portion, said eccentric portion comprising a recess formed on said guide rail and adapted to receive a fixing pin; and a guide rail holder for urging said fixing pin into said recess when said guide rail is rotated to engage said fixing pin with said recess.

* * * * *